United States Patent
Sjöstrand et al.

(10) Patent No.: US 7,826,984 B2
(45) Date of Patent: Nov. 2, 2010

(54) METHOD AND A CONTROL SYSTEM FOR MONITORING THE CONDITION OF AN INDUSTRIAL ROBOT

(75) Inventors: Niclas Sjöstrand, Västerås (SE); Dominique Blanc, Västerås (SE); Shiva Sander Tavallaey, Saltsjöbaden (SE)

(73) Assignee: ABB Research, Ltd., Zürich (CH)

( * ) Notice: Subject to any disclaimer, the term of this patent is extended or adjusted under 35 U.S.C. 154(b) by 56 days.

(21) Appl. No.: 12/068,426

(22) Filed: Feb. 6, 2008

(65) Prior Publication Data

US 2008/0255772 A1 Oct. 16, 2008

(30) Foreign Application Priority Data

Feb. 6, 2007 (EP) ................... 07101800

(51) Int. Cl.
*G01B 3/00* (2006.01)
*G01B 3/44* (2006.01)

(52) U.S. Cl. ............... 702/34; 700/264; 702/33; 714/25

(58) Field of Classification Search ............. 702/33–35, 702/81, 188; 33/503; 73/587; 700/245, 700/284; 714/25; 318/434
See application file for complete search history.

(56) References Cited

U.S. PATENT DOCUMENTS 4,360,886 A * 11/1982 Kostas et al. ............. 700/264

| 5,587,635 A | 12/1996 | Watanabe et al. |
| 5,819,202 A | 10/1998 | Sato et al. |
| 2004/0260481 A1 | 12/2004 | Heiligensetzer et al. |
| 2007/0067678 A1 * | 3/2007 | Hosek et al. ............ 714/25 |

OTHER PUBLICATIONS

European Patent Office Search Report, dated Sep. 17, 2007, issued in counterpart European Application No. 07 101 800.6-1239.
Sukhan Lee et al., "Perception-Net Based Geometric Data Fusion for State Estimation and System Self-Calibration," Proceedings of the 1997 IEEE/RSJ International Conference on Intelligent Robot and Systems-Innovative Robotics for Real-World Applications IROS '97, vol. 3, pp. 1375a-g-1376, 1997.
Bernd Freyermuth, An Approach to Model Based Fault Diagnosis of Industrial Robots, Proceedings of the 1991 IEEE International Conference on Robotics and Automation, Apr. 1991.
I.J. Rudas, Fault Detection in Robots Using Stochastic Filtering, Proceedings of the International Conference on Industrial Electronics, Control and Instrumentation (IECON), Oct. 28-Nov. 1, 1991, vol. 1, conf. 17, Oct. 28, 1991.

* cited by examiner

*Primary Examiner*—John H Le
(74) *Attorney, Agent, or Firm*—Venable LLP; Eric J. Franklin

(57) ABSTRACT

An industrial robot diagnostic method including performing a condition analysis utilizing at least two selected input signals, wherein each selected input signal indicates a condition related to a property of the industrial robot, performing an analysis of any combination of the selected input signals utilizing a signal modeling of the signals and outputting from the condition analyzer a result being at least one of: a detection of a malfunction of the robot system, an identification of a root cause failure in the robot system and prediction of a potential malfunction in the robot system. Also an industrial robot system utilizing the method.

12 Claims, 5 Drawing Sheets

METHOD AND A CONTROL SYSTEM FOR MONITORING THE CONDITION OF AN INDUSTRIAL ROBOT

CROSS-REFERENCE TO RELATED APPLICATIONS

This application claims priority to European patent application 07101800.6 filed 6 Feb. 2007.

TECHNICAL FIELD

The present invention is concerned with monitoring the condition of an industrial robot. The invention is particularly useful for detecting and predicting a malfunction of the robot.

BACKGROUND ART

An industrial robot comprises a manipulator and a control system. The manipulator comprises links movable relative to each other about a plurality of joints. The links are different robot parts such as a base, arms, and wrist. Each joint has joint components such as a motor, motor gear and motor bearings. The movements of the manipulator are driven by the motors. The control system comprises one or more computers and drive units for controlling the manipulator. The speeds and accelerations of the links are controlled by the control system of the robot that generates control signals to the motors.

Industrial robots are used in industrial and commercial applications to perform precise and repetitive movements. It is then important for a faultless functionality of the robot that the industrial robot is performing according to its nominal performance, that means that the links and joints has to bee in good condition and perform together in an expected way.

However it is difficult to detect or determine if an industrial robot is not performing according to its nominal performance. The operator, such as a service technician, has to rely on what he sees and information from the control system about the performance of the robot such as the position and speed of the motors taken from readings on sensors on the manipulator. The operator then analyse the current condition of the robot based on his personal experience resulting in a varying diagnosis due to subjective measures. In many cases the operator analysing the current condition and performance of the robot also needs to evaluate information from different sources, such as different motors at the same time or external conditions in the facility where the robot is located or is even faced with an emergency stop. To find the cause of a failure the operator may have to try different hypothesis and it is therefore time consuming and often results in long stand-still periods for the robot causing huge costs.

Also due to frequent personal rotation today, operators of robot service technician staff do not have sufficient experience to diagnose and isolate a failure in the performance of the robot.

Further, if a failure in performance causing an emergency stop occurs, it is difficult to isolate the problem cause and what link or part of the robot that needs special attention.

The document: Lee S et al:"Perception-net based geometric data fusion for state estimation and system self-calibration", Proceedings of the 1997 IEEE/RSJ international conference on intelligent Robot and Systems, Innovative Robotics for real-world application, IROS '97 (Cat. No. 97CH36108) IEEE New York, N.Y., USA, vol. 3,1997, pages 1375a-g, 1376, XP-002449427: 0-7803-4119-8, discloses a method of automatically reducing uncertainties and calibrating possible biases involved in sensed data and extracted features by a system based on the geometric data fusion. A perception net, as a structural representation of the sensing capabilities of a system, connects features of various levels of abstraction, referred to as logical sensors with their functional relationships as constraints to be satisfied. Data fusion is presented as a unified framework for computing forward and backward propagations through which the net achieves the self-reduction of uncertainties and self calibration of biases. Said document does not mention anything about the use of the results of the performed state estimation for predicting a residual lifetime of a specific component of a robot system or a whole robot system.

Document U.S. Pat. No. 5,819,202 discloses an apparatus for detecting an abnormality of a control system. An internal property calculating section of the control system calculates an internal property of the control system on the basis of a command value representing a position or a speed of the control system. Said document does not mention anything about the use of the detection of an abnormality for predicting a residual lifetime of a specific component of a robot system or a whole robot system.

Document US 2004/0260481 A1 provides a method for monitoring movable parts of a machine. At least two measuring devices for detecting different measured quantities are provided. A comparison unit compares a first measure result with at least a second measure result of the measured quantity. Said comparison is not used for any predicting a residual lifetime of a specific component of a robot system or a whole robot system.

SUMMARY OF THE INVENTION

One aspect of the present invention is to provide a method for automatically monitor an industrial robot and to predict potential malfunction of the robot.

According to the aspect of the invention it is possible to monitor multiple input signals with a condition analyzer to:
1. Detect condition changes in any combination of input signals.
2. Identify root cause of the detected condition change based on information in any combination of input signals.
3. Predict condition deterioration based on any combination of input signals See also FIG. 1C.

A number of signals generated in the industrial robot are monitored by the condition analyzer. Each signal indicates a condition of a related property of the industrial robot system. The property of the industrial robot system can be related to the complete robot system (one or more industrial robots) or parts of the robot system such as controller unit or manipulator or components in the parts of the robot system such as motor, gearbox or ventilation fans or even parts of the component, such as bearings in a gearbox. The condition is the status of a property indicating whether the property behaves properly or not.

Through an analysis of said signals in the condition analyzer, it is possible to perform the three measures listed according to the invention.

When the condition of the robot manipulator or the control system changes due to wear, for example, increased backlash and friction, and/or external disturbances, any of the input signals may change its information, whereupon the condition analyzer will capture a change in the condition.

One object of the invention is to: detect, isolate and/or predict a condition of a robot manipulator and/or control system using more than one condition signal in a condition analyzer as generally described above.

An idea is to use redundancy in a structured way to get a more accurate result in terms of a reduced false alarm rate and missed alarms rate.

Input to the condition analyzer is accomplished by means of an arbitrary number of more than two input signals, i.e. signals carrying information about the condition of the robot system. Herein input signals are defined as any of the alternatives below.

1. A signal consisting of more than one sample per measurement, i.e. y(tk,i, m), where k is the sample number in the measurement, i the signal number and m is the measurement number. Examples of such signals are torque or speed from the robot which are measured during a time window.
2. A signal consisting of a single value per measurement of a continuous signal, i.e. y(i, m) where i is the signal number and m is the measurement number. Such a signal is, for example, temperature, fan speed, friction or backlash.
3. A signal consisting of a binary single value per measurement, i.e. yd(i, m) where i is the signal number and m is the measurement number. This can be either a binary signal, such as: fan on/off, temperature high/low, friction high/low.

The input signals may be derived from the robot control system or by any external equipment or other diagnostic methods. The condition analyzer may use any combination of available input signals to detect, isolate and predict the condition of the robot system. The term "any combination" means that two, three, four, and so on, up to all said available input signals can by used in the analysis.

The results obtained and outputted from the condition analyzer can be any combination of:
  Detection, i.e., detect condition changes in the robot system.
  Identify, i.e., isolate root cause of condition changes in the robot system.
  Prediction, i.e., predict condition deterioration in the robot system.

The condition analyzer can further be provided with a notification arrangement, which is set to issue a notification if any of the described results are enabled. In case of isolation of a failure, the root cause is sent together with the notification and in case of a prediction of a failure, the remaining time of the component, e.g., is sent together with the notification. The notification can be implemented according to a proper arrangement, such as a message on a display, an sms, an e-mail, a warning-lamp, a phone call, an executed alarm, etc., for alerting a designated receiver of said result. It should further be understood that the condition analyzer is performed by hardware and/or software units.

Said signal modeling of the signals can use for example an analysis method from the group of:
  a Boolean network of selected input signals and conditions indicated by said signals,
  Filtering of selected signals such as weighting the sum of conditions indicated by a selection of said signals,
  a Multivariate Data Analysis (MDA) to identify combinations of input signals and/or relations between the input signals, and
  a Multi Layer PCA data analysis approach.

It should be understood that said signal modeling analysis are examples creating a general protection for multi sensor data fusion in the technical field of industrial robots. Other signal modeling methods, than those listed here, for modeling said at least two input signals, as recognized by the man skilled in the art, are as well applicable for the fusion of said sensor data according to the aspect of the invention.

An advantage of the invention is that it is possible to overcome the drawbacks with respect to personnel judging the performance of the robot, as the invention provides a simple method for automatically monitor the current performance or condition of the robot.

DESCRIPTION OF PREFERRED EMBODIMENTS

A number of embodiments of the present invention supported by the appended drawings are described below.

Primarily, an overview of an industrial robot system is presented to indicate examples of input signals assembled from different sensors distributed throughout the robot system, as well as calculators for providing the condition analyzer with selected signals.

Figure 1A:
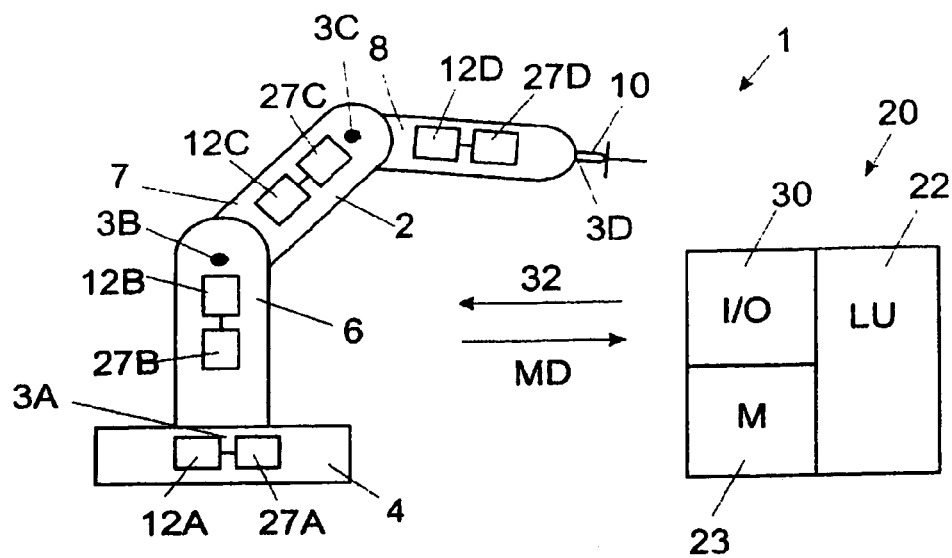
FIG. 1A shows an industrial robot comprising a manipulator and a control system adapted to control the robot.

FIG. 1A shows an example of an industrial robot 1 comprising a manipulator 2 and a control system. The industrial robot has a plurality of links movable relative to each other about a plurality of joints 3A, 3B, 3C, 3D, in this case rotatable in relation to each other around an axis of rotation. The links are in this case robot parts, such as a stand 4, robot arms 6, 7, 8, and a wrist 10 comprising a turn disc. The industrial robot comprises a plurality of motors 12A, 12B, 12C and 12D controlling the position and speed of the links. The control system is illustrated as a simplified block diagram. The control system comprises, in this case, a control unit 20 including one or more logic units 22, a memory unit 23 and drive units 27A, 27B, 27C, 27D for controlling the motors. The logic unit comprises a microprocessor, or processors comprising a central processing unit (CPU) or a field-programmable gate array (FPGA) or any a semiconductor device containing programmable logic components. The control unit is adapted to run a control program, stored in the memory unit 23. The control unit is further adapted to generate a movement path based on movement instructions in the control program run by the logic units 22. The drive units 27A, 27B, 27C, 27D are controlling the motors by controlling the motor current and the motor position in response to control signals from the control unit 20. The control unit 20 comprises input/output interfaces (I/O) 30. On the robot and in the environment surrounding the robot is also arranged a plurality of sensors. The sensors on the manipulator 2 and in the environment of the manipulator 2 are connected to the I/O 30 of the control unit 20 via a wired or wireless link 32. The control unit 20 thereby receives signals comprising measured data MD. The measured data MD can be addressed to either the control unit, the manipulator, process application data, process quality data or external measurement devices. Control unit data can for example be ventilation fan speed, temperature, memory usage, battery, I/O and bus status etc. Process application data can for example be cycle time, current, flow and other measured process variables. Process quality data is variables measuring the robot operation result such as welding position accuracy, paint surface evaluation etc. External measurement devices can for example be vibration sensor such as accelerometer or microphone or electromagnetic acoustic emission sensor, gyroscope, strain gauge, global positioning such as cameras or laser etc. Manipulator data is for example motor angular, speed and torque, motor and gearbox temperature, link angular, position and torque. Other examples are cycle time, and energy consumption.

Figure 1B:
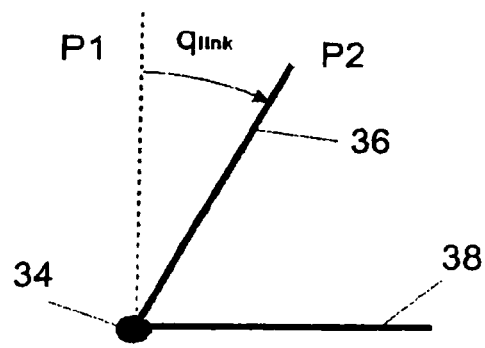
FIG. 1B shows two links movable relative to each other about a joint.

A model of the joints is established. FIG. 1B illustrates such an embodiment of a model of a joint 34, wherein the model comprises, in this case, two links 36, 38 movable relative to each other about the joint 34. The model relates to an industrial robot that has rotational axes, linear axes or a mixture of both.

In the robot model the robot joint 34 is connecting a first link 36 and a second link 38. The first link 36 is considered moving relative the second link 38. In the figure a movement of the first link 36 from a first position P1 to a second position P2 is illustrated, which corresponds to an angular position $q_{link}$. In order to get the angular position of the link, $q_{link}$, it is necessary to transform the data from the angular position, $q_m$, of the motor controlling the link. The transmission from the motor to the link in this case, is characterized by a gear ratio n and the moment of the rotational inertia of the link and motor. We therefore use the assumption that the angular position $q_{link}$ of the first link relative to the second link is considered corresponding to an angular position $q_m$ of the motor.

$$q_m = n * q_{link} \quad (1)$$

In the embodiments of the method described below the measured data for the joint 34 in this case comprises information on the angular position $q_m$, and the torque $T_m$ of the motor. The velocity $q_m'$ and the acceleration $q_m''$ of the motor are in this case derived from the angular position $q_m$, for instance, using central difference calculations.

$$\text{Velocity} = v = q_m' \quad (2)$$

$$\text{Acceleration} = a = v' = q_m'' \quad (3)$$

Figure 1C:
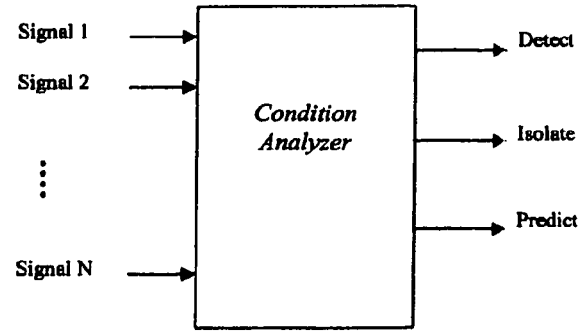
FIG. 1C shows the condition analyzer and the signals related to it according to aspects of the invention.
Figure 2:
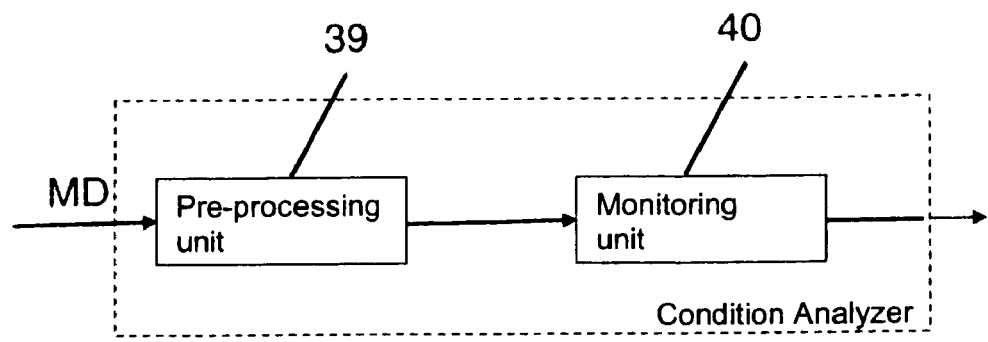
FIG. 2 shows a block diagram of a part of a control system for monitoring an industrial robot.

FIG. 2 shows a part of the control system for monitoring an industrial robot such as the industrial robot 1 described above. The control system comprises a pre-processing unit 39 and a monitoring unit 40. The pre-processing unit 39 is used to calculate condition parameters $S_p$ from the measured data MD. This unit performs operation of varying complexity depending on the character of MD. In cases where MD consists of condition parameters, like battery status, the pre-processing unit will only forward the data to the monitoring unit. In other cases where MD consists of multiple valued signals the pre-processing can include more complex signal processing algorithms. It is to be understood that the part of the control system shown in FIG. 2, herein referred to as: "condition analyzer", FIG. 1C, comprises these units, 39 and 40, either as hardware or software units.

The monitoring unit 40 is according to the present invention the condition analyzer adapted to monitor the condition of the robot, wherein the signal, in this case the condition parameter $S_p$, can be one of the selected input signals to the condition analyzer.

As stated, the input signals provided to the condition analyzer of the present invention may be derived from the robot control system (as indicated above) or by any external equipment or other diagnostic methods. The condition analyzer may use any combination of available input signals to detect, isolate and predict the condition of the robot system. This is performed by the condition analyzer using any of the methods listed and described more in detail below. It must further be expressly stated that the unit (or logics) referred to as the: "condition analyzer" not necessarily has to be sited in the Control Unit (the controller) of the robot. The condition analyzer may as well be localized in an externally located device, such as a PC, or the like.

Method 1: Boolean Network of Input Signals and Condition Indication.

The prerequisite in this implementation is that only binary inputs are allowed, i.e. the input signals are singular values and can only be 1 or 0. In this case the binary signals carry information ok or not ok. This can be denoted as an example, if the temperature at any measured points is to high as: "temperature high-not ok" or if the temperature at that point is normal as: "normal-ok". Another example could be a measurement of friction at a predetermined point, where it is stated if the friction has increased too much that: "friction-not ok" or if the friction is within an allowed range as: "normal-ok".

Based on the properties of the signal in combination with prior knowledge, a logical scheme or network can be used to detect if the condition of the robot system is ok or not. In the table below is an example where three signals from one robot joint is used. In the example there are 4 situations where a condition change is detected (case 3, 4, 7 and 8). In two of the cases (4 and 7) the root cause is isolated. This would not have been possible without using information from all three signals.

| Case | Decision | Gear temp | Joint friction | Motor temp |
|---|---|---|---|---|
| 1 | Normal | 0 | 0 | 0 |
| 2 | Normal | 0 | 0 | 1 |
| 3 | Failure detected | 0 | 1 | 0 |
| 4 | Motor failure | 0 | 1 | 1 |
| 5 | Normal | 1 | 0 | 0 |
| 6 | Normal | 1 | 0 | 1 |
| 7 | Gear failure | 1 | 1 | 0 |
| 8 | Failure detected | 1 | 1 | 1 |

There are different ways to generate the logical scheme. First, prior knowledge can be used, as in the example above. Second, it is possible to use statistic analysis and prior failures to recognize different failure modes. This is sometimes called training.

Method 2: Weighted Sum of Selected Signals.

In contrast to method 1 where binary input was used, this method uses continuous input signals. For example, the temperature value is not only ok or not-ok but the actual temperature value is used, i.e. as an example, 48° C.

This can also be used by a logical network or Principal Component Analysis (PCA) but here we will use standard weighting. In the equation below is the general formulation of a weighted sum which can be used in the network.

$$IndicatorValue = \sum_i w_i y_i$$

Consider the following example where all input signals are normalized to be between 0 and 1 (for notation simplicity).

$$IndicatorValue = \sum_i w_i y_i$$
$$= \frac{1}{4} GearTemp + \frac{1}{2} JointFriction + \frac{1}{4} MotorTemp$$

In the example above the signals are combined to detect condition changes. The selected weights can be interpreted so that "JointFriction" and at least one other signal must be close to one to detect a failure. This will increase the robustness of the detection and can also be used to reduce the number of false alarms.

If the purpose is to isolate a failing component, or failing element, it is possible to create more than one indicator value. Each indicator value will then be used to isolate different failure modes.

$$I_1 = \frac{1}{4}(1 - GearTemp) + \frac{1}{2} JointFriction + \frac{1}{4} MotorTemp$$
$$I_2 = \frac{1}{4} GearTemp + \frac{1}{2} JointFriction + \frac{1}{4}(1 - MotorTemp)$$
if($I_1$) > $h_1$
  then Motor failure detected
else if($I_2$) > $h_2$
  then Gearbox failure detected In the example above, I1 is used to isolate motor failure, while I2 is used to detect gearbox failure.

This can of course be extended to a more general approach but here it was only used to exemplify how to use the method.

Method 3: Multivariate Data Analysis.

Figure 3:
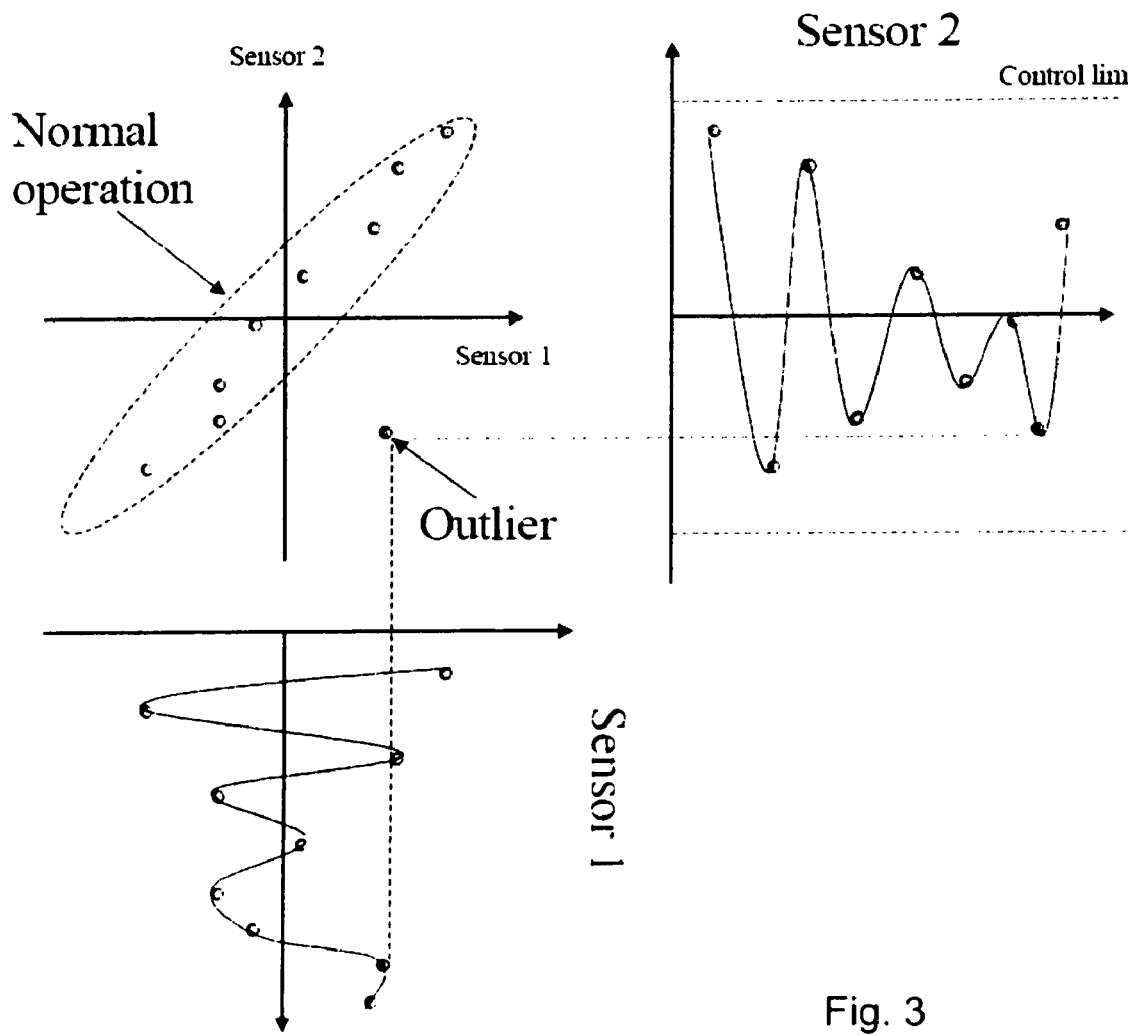
FIG. 3 shows data points formatted in a Multivariate Data Analysis method.

Another way to implement the condition analyzer is to use MDA to identify combinations and/or relations to the different input signals. In MDA data are formatted in data points, i.e. [x1, y1; x2, y2; . . . ] where x1 and y1 are samples from two signals at time 1. This is different to classical methods where data are formatted in time plots (see FIG. 3).

Figure 4A:
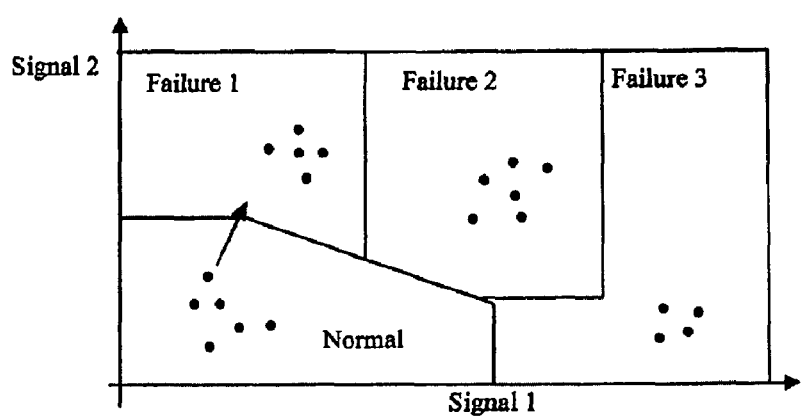
FIG. 4A visualizes a plot of data points in two dimensions. In the figure there are four different clusters of data and by use of Multivariate Data Analysis it is possible to divide the data space into different regions.

An example plot of data points sampled from two different input signals (two dimensions) is visualized in FIG. 4A. In the figure there are four different clusters of data and in MDA it is possible to divide the data space into different regions. Each region is related to a known state, e.g., normal operation or failure X. Each data point will get the following properties:
Classification of state,
Direction (see the arrow in the figure),
Step size (speed in the direction).

Figure 4B:
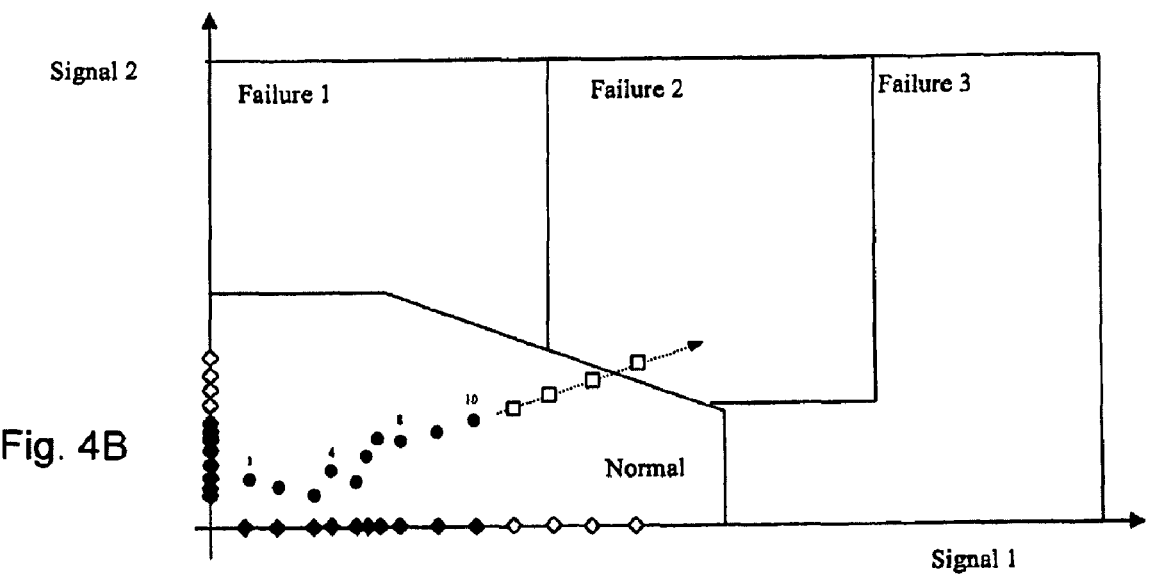
FIG. 4B visualizes a plot of data points corresponding to the example of FIG. 4A, but where the data points from two signals indicate that a prediction of a failure is obtained.

Detection and isolation of a failure is solved by classifying each data point, while prediction is solved by using the direction of the data point. The direction will give information if the data are about to enter a failure state during the prediction horizon. An example of prediction by Multivariate Data Analysis is visualized in FIG. 4B. In the figure there are four different states, one normal and three failure states. The black circles represent all currently available data points. The data points, filled circles, have been recorded in chronological order, that is in the order 1, 2, 3, . . . , N where N is 10 in the figure. Now, future data points are predicted from the data point history (1 . . . N). In the figure the prediction is performed along the direction of the arrow and the four prediction steps are visualized in the figure by black squares. The prediction result is that failure state 2 will be reached within the prediction horizon (four steps). If information from only one signal is used, i.e. signal 1 or signal 2, the result will be that, within the prediction horizon no failure state will be reached. In the figure this is visualized with diamonds (filled diamonds are data points and non-filled are prediction result).

Method 4: Multi Layer PCA Data Analysis Approach.

Suppose that the condition analyzer receives different types of input data. The input signals consist of an arbitrary number of external sensors signals $V_n$, motion data $M_i$ and device data $D_j$ signals. The condition analyzer will then pre-process each data depending on signal and data type using different algorithms.

An example of such an analysis is described below (supported by FIG. 5).

Pre-processing of the external signals $V_n$, in this example, consists of calculation of the overall High Frequency RMS, Peak-to-Peak, CrestFactor and Kurtosis as well as Peak-to-Mean values of the signals. These variables are then used primarily to train a Principal Component Analysis (PCA) model on the normal behaviour of the system seen by the external sensors. The condition severity factor Q, i.e. the deviation from the normal behavior in Principal Component space, is then calculated each time herein, whereupon a "new" single valued signal describing the system as seen from the view of one particular type of signal. This step of analysis is visualized in FIG. 5. The, so called "new" input signal is then used as an input signal to the condition analyzer according to the invention.

Figure 5:
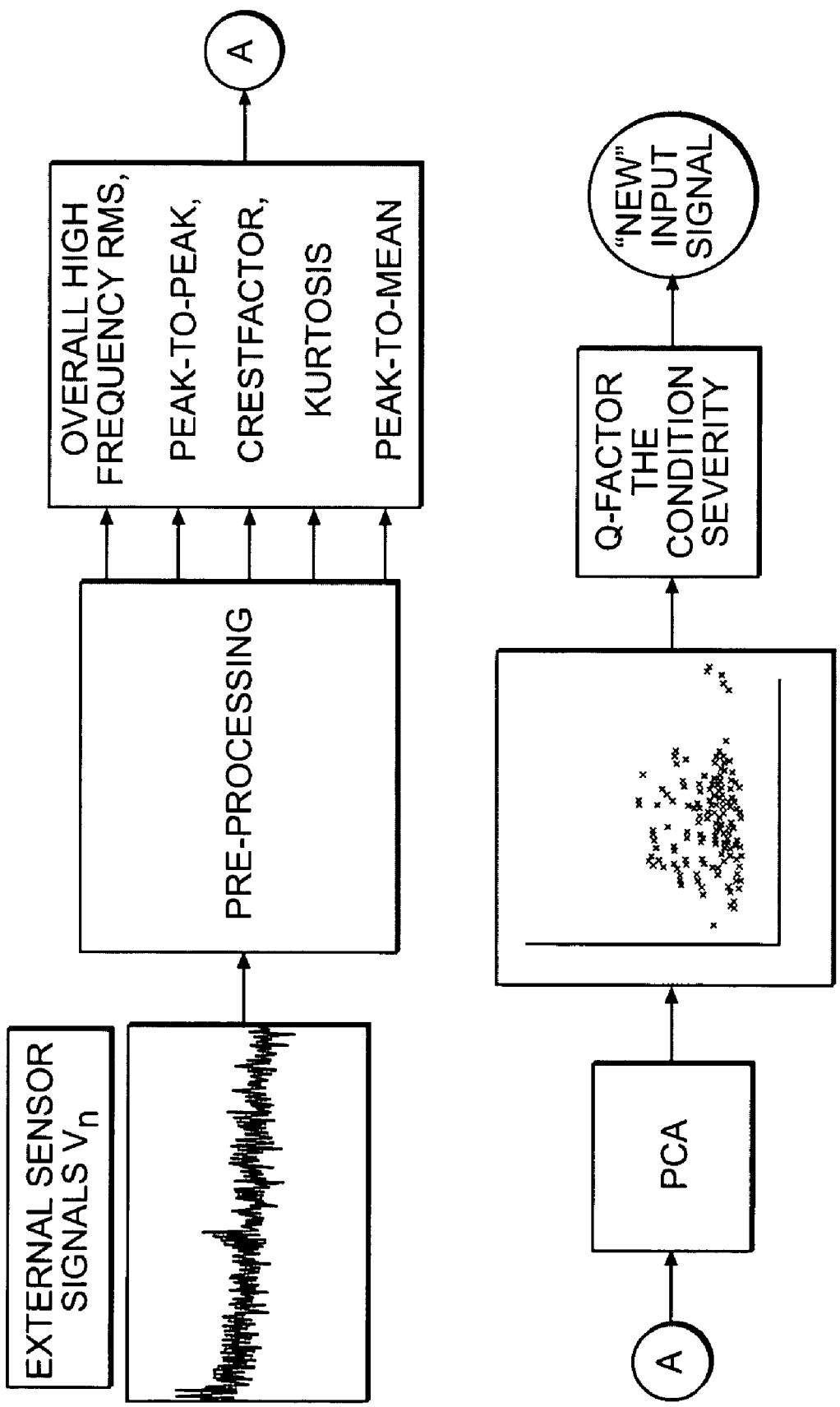
FIG. 5 is a flow chart over the pre-processing of external sensor signals $V_i$ to be integrated in the condition analyzer.

FIG. 5 is a flow chart over the pre-processing of the external sensor signals $V_n$ to be integrated in the condition analyzer. The diagram at the beginning is shown as an example of a signal being processed in later steps. The diagram illustrates, as an example, an external signal from a fan included in the industrial robot system. The plot in the middle of the second row is an illustrative example of scores in two dimensions of the monitored component in the Principal Component space.

A second step of pre-processing is the estimation of friction and backlash measures using robot motion data. The estimated measure on friction and/or backlash will be a second group of the "new" single valued signals describing the system seen from another particular type of signals view.

To obtain such an estimation of, as an example, friction measurements in one embodiment this is performed by use of an assumption that only one link of the robot is moving. We construe the collecting of measuring data so that the components dependent on gravity cancel each other. This will give a simpler calculation. The embodiment comprises:
  moving one of said links in the direction of gravity,
  moving said one link in a direction opposite the gravity direction,
  collecting measuring data during the movements of the link,
  keeping the velocity essentially constant while collecting the measured data, and calculating at least one friction value based on the collected measured data.

In said embodiment, when moving only one link so that components dependent on gravity cancel each other, the at least one friction value is the viscous friction ($F_v$).

The following equation is for instance used to solve the difference between the measured motor torque $T_{mforward}$ in a first direction and the measured motor torque $T_{mback}$ in the opposite direction.

$$T_{fric} = [T_{mforward} - T_{mback}(q'_m, q)]/2,$$

wherein $q'_m$ is the velocity of the motor rotating the robot link and q is its position.

This pre-processing of different types of data using different tools integrated in the condition analyzer, will end up with a certain decision on the fault detection and isolation followed by an estimation of the remaining lifetime of either the whole system or one special component in it.

Figure 6:
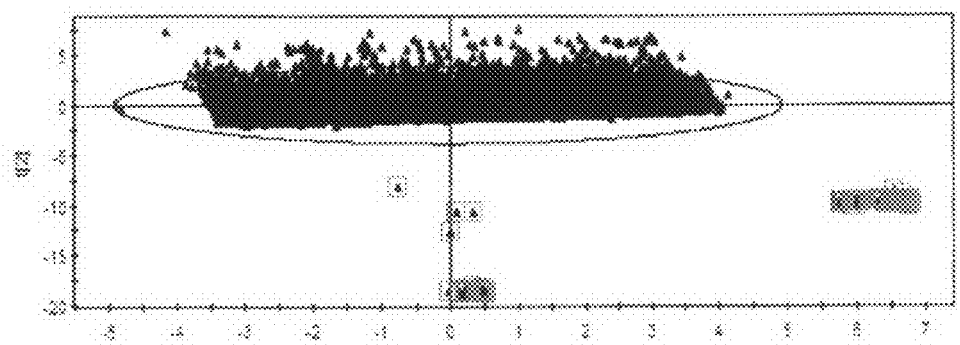
FIG. 6 shows a scores plot in PC-space indicating how the abnormal behavior in the system can easily be identified by use of modeling according to an aspect of the invention.

In FIG. 6 it is shown how the abnormal behaviour in the system can easily be identified in a scores plot in PC-space. In this example the device data, friction measures as well as the calculated Q-factors for the external sensor signals are included in the analysis. It can easily be observed that some plots lies well outside the normal behavior of, e.g., the component analyzed.

Figure 7:
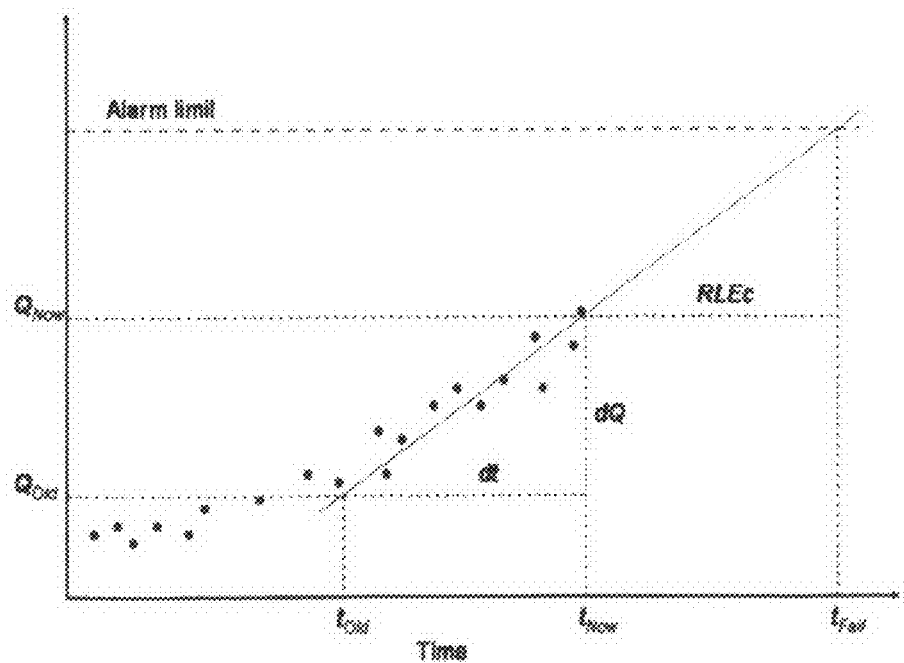
FIG. 7 depicts an estimated condition severity factor of the whole system indicating the remaining life time for the system trended and predicted according to the invention.

The prediction of residual lifetime due to changes in system parameters is possible if there is a deterioration of the condition. In this case the Q, the distance of the current data and the developed model is gradually increasing. Thus it is possible to trend the increase of Q with a polynomial fit and with dQ/dt extrapolate until the breaching of a certain limit. FIG. 7 depicts the estimated condition severity factor of the whole system trended indicating the remaining life time for the system.

The invention claimed is:

1. An industrial robot system condition analysis method, comprising:
   monitoring at least two selected input signals, each selected input signal indicating a condition related to a property of the industrial robot system,
   using a processor for analyzing any combination of said selected input signals utilizing a multivariate data analysis to identify combinations of input signals and/or relationships between the input signals, wherein said multivariate data analysis of a selection of said signals comprises
      formatting the data of n selected signals as data points in an n-dimensional space, classification of state of each data point, wherein said state indicate one of: normal operation or failure, and
      determining a direction of each of said data points indicating a direction in said n-dimensional space in which the data point tend to move, and
   detecting condition changes in the robot system based on a result of said analysis.

2. The method according to claim 1, further comprising: identifying a root cause of said condition changes in the robot system.

3. The method according to claim 1, further comprising: predicting a failure.

4. The method according to claim 1, wherein said analysis of said selected input signals is performed by utilizing a signal modeling of the input signals.

5. The method according to claim 1, wherein an input signal used in the condition analysis comprises a signal carrying information about the condition of the robot system, said signal being any one from the group of:
   a signal comprising more than one sample per measurement, $y(t_k, i, m)$, where k is the sample number in the measurement, i is the signal number and m is the measurement number;
   a signal comprising a continuous single value per measurement, $y(i, m,)$, where i is the signal number and m is the measurement number;
   a signal comprising a binary single value per measurement, $y_d(i, m)$ where i is the signal number and m is the measurement number.

6. The method according to claim 1, wherein said Multivariate Data Analysis of said signals further comprises:
   classification of the state of a data point indicates at least one of: detection of a failure of the robot system and isolation of a component being the root cause of a failure in the robot system; and
   said determination of the direction of said data point is used for the prediction of the lifetime of a component causing a failure in the robot system.

7. A computer readable medium embodying a computer program product, the computer program product comprising:
   computer program instructions recorded on the computer readable medium and executable by a processor for performing a method comprising monitoring at least two selected input signals, each selected input signal indicating a condition related to a property of the industrial robot system, analyzing any combination of said selected input signals utilizing a multivariate data analysis to identify combinations of input signals and/or relationships between the input signals, wherein said multivariate data analysis of a selection of said signals comprises formatting the data of n selected signals as data points in an n-dimensional space, classification of state of each data point, wherein said state indicate one of: normal operation or failure, and determining a direction of each of said data points indicating a direction in said n-dimensional space in which the data point tend to move, and detecting condition changes in the robot system based on a result of said analysis.

8. The computer program product according to claim 7, wherein said computer program instructions further comprise algorithms for performing signal modeling of said at least two input signals.

9. The computer program product according to claim 7, wherein the computer program product is performed as software and/or hardware.

10. An industrial robot system condition analysis method, comprising:
    monitoring at least two selected input signals, each selected input signal indicating a condition related to a property of the industrial robot system,
    using a processor for analyzing any combination of said selected input signals utilizing a multi layer principal component analysis approach, wherein said multi layer principal component analysis approach comprises
       selecting sensor signals of the robot system,
       pre-processing said sensor signals by means of calculation of high frequency RMS, peak-to-peak, crest factor, kurtosis and peak-to-mean values of the signals,
       performing a principal component analysis model of a normal behavior of the robot system based on said pre-processing of the selected signals, and
       determining a severity factor Q, representing a deviation from said normal behavior of the robot system, and detecting condition changes in the robot system based on the result of said analysis.

11. The method according to claim 10, wherein said Multi Layer Principal Component Analysis data analysis approach further comprises:
said severity factor Q is a base for: detection of a failure of the robot system, isolation of a component being the root cause of a failure in the robot system, prediction of the remaining lifetime of a component causing a failure in the robot system, prediction of the lifetime for the whole robot system.

12. A computer readable medium embodying a computer program product, the computer program product comprising:
computer program instructions recorded on the computer readable medium and executable by a processor for performing a method comprising monitoring at least two selected input signals, each selected input signal indicating a condition related to a property of the industrial robot system, analyzing any combination of said selected input signals utilizing a multi layer principal component analysis approach, wherein said multi layer principal component analysis approach comprises selecting sensor signals of the robot system, pre-processing said sensor signals by means of calculation of high frequency RMS, peak-to-peak, crest factor, kurtosis and peak-to-mean values of the signals, performing a principal component analysis model of a normal behavior of the robot system based on said pre-processing of the selected signals, and determining a severity factor Q, representing a deviation from said normal behavior of the robot system, and detecting condition changes in the robot system based on the result of said analysis.

* * * * *